June 11, 1963  J. O. STARR  3,093,127
TARGET-THROWING DEVICE
Filed Feb. 8, 1960  6 Sheets-Sheet 1

United States Patent Office 3,093,127
Patented June 11, 1963

3,093,127
TARGET-THROWING DEVICE
James Olan Starr, 510 W. California St., Urbana, Ill.
Filed Feb. 8, 1960, Ser. No. 7,288
7 Claims. (Cl. 124—8)

This invention relates to a target-throwing device and, more particularly, to a target-throwing device including automatic loading, cocking and firing mechanisms.

The target-throwing device of this invention finds utility in the handling of clay targets, i.e., "birds," such as are used in trap or skeet shooting.

Although target-throwing mechanisms for this use have been known for a long period, there has coexisted a problem in the handling of the targets because of the extensive breakage thereof. This has occurred irrespective of whether the handling was manual or automatic. With the advent of indoor trap shooting and the utilization of lower-powered guns, this problem has become all the more aggravating since the cost of a target constitutes a substantial portion of the cost of trap shooting. Hence, any unnecessary breakage of targets is all the more undesirable.

One of the principal areas where breakage occurs is in the loading operation. The targets are relatively fragile and are incapable of sustaining any rough handling.

It is therefore a principal object of this invention to provide a novel target-throwing apparatus which is singularly effective in maintaining the integrity of targets thrown, irrespective of the fact that the targets might be quite fragile.

Another object is to provide a novel loading mechanism for a target-throwing apparatus which includes a spring-loaded throwing arm, the loading mechanism being operative to delicately place a target on the throwing arm when the same is in a cocked position.

Still another object is to provide a novel loading mechanism for a target-throwing apparatus in which targets are sequentially supplied to a pivotally mounted, spring-urged throwing arm and wherein successive targets are caused to interact by the loading mechanism so as to provide stability and therefore resistance to premature rupture of the targets.

Yet another object is to provide a novel electro-mechanical arrangement in target-throwing apparatus that effectively isolates the operations of cocking, loading and firing.

A further object is to provide a target-throwing apparatus which includes a novel throwing arm arranged so as to minimize the chance of target breakage prior to discharge thereof.

Other objects and advantages may be seen in the details of construction and operation set forth hereinafter.

The invention will be explained in conjunction with an illustrated embodiment in the accompanying drawing, in which—

Figure 1:
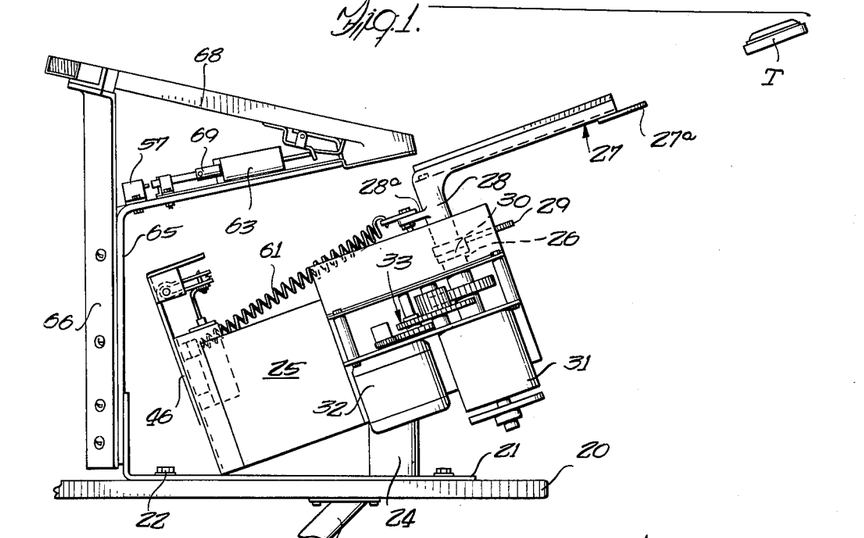
FIG. 1 is an elevational view of a target-throwing apparatus and showing a target in flight.
Figure 2:
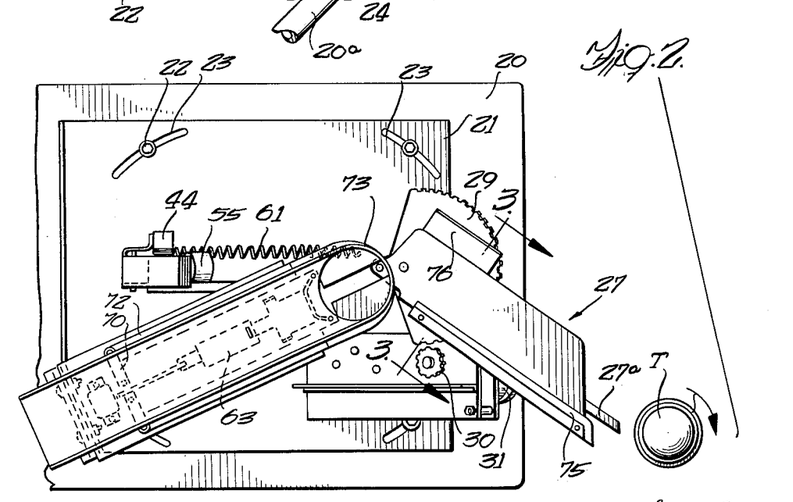
FIG. 2 is a top plan view of the apparatus of FIG. 1.

In the illustration given, and with particular reference to FIGS. 1 and 2 of the drawing, the numeral 20 designates a base for the throwing apparatus of the invention. The base 20 is seen to be equipped with a depending leg 20a which may be adjustable so as to reposition the orientation of the base 20. Secured to the base 20 is a base plate 21 carrying the target-throwing apparatus, and this securement is achieved through the employment of bolts 22 extending through arcuate slots 23 in the plate 21.

Extending upwardly from the base plate 21 and secured thereto is a pedestal 24. The pedestal 24 is equipped with a bracket 25 for supporting various portions of the target-throwing apparatus. One such portion is a bearing 26 (designated only in FIG. 1). This bearing 26 pivotally supports a throwing arm generally designated 27 and which, in FIGS. 1 and 2, is seen discharging a target T.

For the purpose of supporting the throwing arm 27 within the bearing 26, the throwing arm is equipped with an integral post portion 28 which extends at right angles to the generally flat throwing arm. The post 28 is equipped with a segmental gear 29 which can also be seen in FIG. 4 as well as FIGS. 1 and 2.

The segmental gear 29 is engageable with a pinion gear 30, the engagement being made possible through the provision of a solenoid 31. The pinion gear 30 is driven through a train of gears, generally designated 33, by a motor 32 which is also mounted on the bracket 25. In the illustration given, the gear train 33 includes gears 34–39 which are effective to give a speed reduction of the order of 40 to 1.

Figures 3, 4, 5:
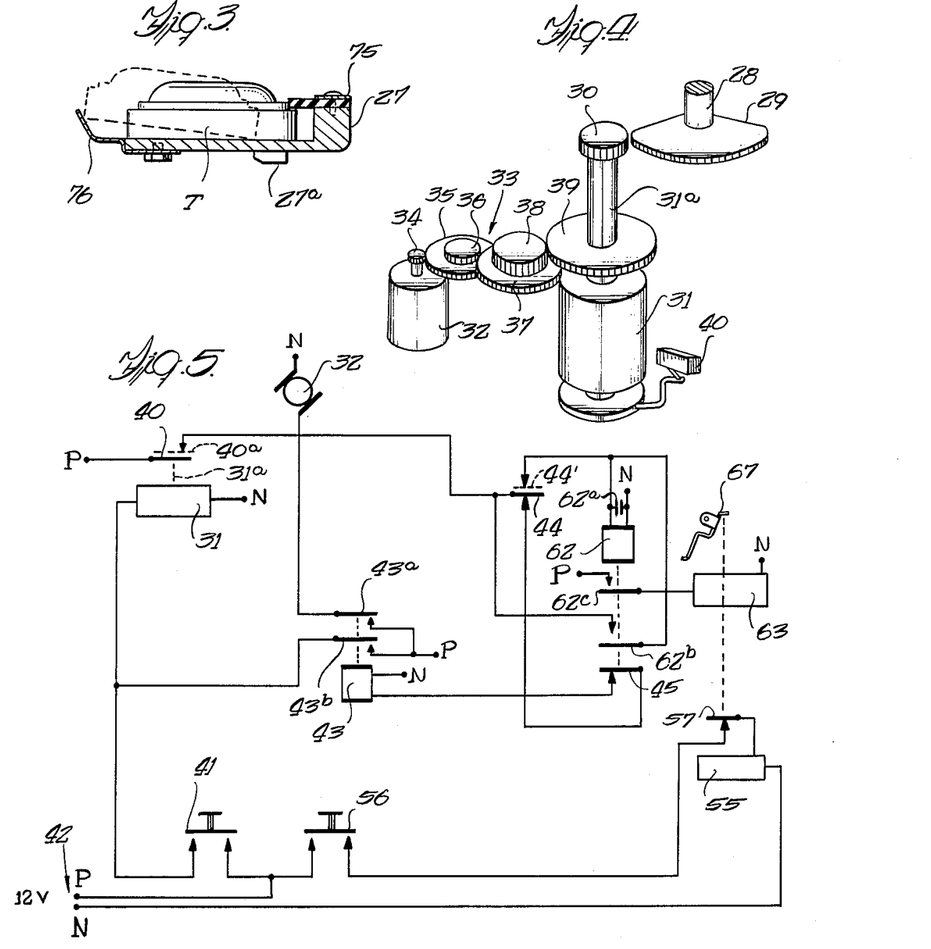
FIG. 3 is a fragmentary sectional plan view in enlarged scale taken along the line 3—3 of FIG. 2.
FIG. 4 is an enlarged fragmentary perspective view of the power transmission mechanism seen in FIG. 1.
FIG. 5 is a schematic wiring diagram employed in the apparatus.

The numeral 40 (see the upper left-hand portion of FIG. 5) designates a microswitch which is actuated by the movement of the armature 31a of the solenoid 31 (see FIG. 4). For this purpose, the apparatus is provided with a power source 42 (designated only in FIG. 5) which may be a remote power pack providing 12-volt direct current through a "Load" switch 41.

The elements thus far described are particularly involved in the cocking operation and this operation is briefly described relative to those elements immediately below.

Cocking Operation

When it is desired to cock the apparatus, the operator depresses the button of switch 41 thereby coupling the positive line of source 42 to the solenoid 31, one terminal of the solenoid 31 being continuously connected to the negative side of the voltage source. This results in movement of the solenoid armature 31a with the consequent closing of the microswitch 40 (the closed position of the microswitch 40 is seen in FIG. 5 in dotted line and is designated by the numeral 40a). Simultaneously, the movement of the armature 31a engages the gears 29 and 30 so that it is now possible to transmit power from the motor 32 to the throwing arm 27.

Still referring to FIG. 5, the actuation of the microswitch 40 results in actuation of a relay 43 (seen in the center of FIG. 5). When this occurs, electrical power is applied to the motor 32 through the relay contact 43a and a holding voltage is applied to the solenoid 31 through the relay contact 43b—this latter being necessary inasmuch as there is only a momentary depression of the button of switch 41. The current in flowing from the source to relay 43 passes not only through microswitch 40 but through a limit microswitch 44 and a normally closed interlock 45.

The actuation of the motor 32 operates to pivot the arm 27 through the gear train 33 to the cocked position (this direction of movement being clockwise in FIG. 2).

The cocking movement of the throwing arm 27 continues until the arm 27 engages the limit microswitch 44 (also seen in FIG. 2). The microswitch 44 is mounted on the pedestal bracket 25 and is engaged by a lug 27a extending outwardly from the unattached end of the throwing arm 27. The opening of the microswitch 44 (this switch being normally closed as seen in FIG. 5) serves to break the electrical circuit which included switches 40 and 44, interlock 45, and relay 43. This results in the opening of relay 43 to the condition seen in FIG. 5, thus stopping the motor 32 and deenergizing the solenoid 31. Thus, the arm 27 is in a retracted position but as yet is not latched or cocked. The mechanism for this will now be described, and with particular reference to FIGS. 13–16.

The latching or cocking mechanism is supported on a bracket 46 (seen adjacent the left-hand side of FIG. 1) and this bracket provides a support for the previously referred to microswitch 44. The bracket 46 is equipped with a top plate 47 (see FIG. 16 in particular), as well as an integral ear 48. The bracket 46 is Z shaped in top plan, and a portion 49 thereof (FIGS. 14–16) actually provides the support for the microswitch 44.

The numeral 50 designates a pin which extends through an opening 48a in the ear 48 and a corresponding opening (not shown) in the bracket 46. The numeral 51 designates a bottom plate, while the numeral 52 designates an intermediate plate, these two plates along with the top plate 47 cooperating to help in defining the latching mechanism for the arm 27. The bottom plate 51 is maintained in a position generally normal to the bracket 46 by means of a spring 53, while the intermediate plate 52 is spaced above the bottom plate 51 and maintained in that position by means of a stop hole 54—the preceding structure being best seen in FIG. 16.

The numeral 55 designates a solenoid (see also FIG. 5) which is mounted on the bracket 46. The solenoid 55 is the "firing" solenoid which is operative upon closing of the firing switch 56 (seen only in FIG. 5). Also included in the firing circuit is a safety interlock 57 to be described later.

The solenoid 55 is equipped with an armature arm 58, the armature arm 58 in turn being equipped with an extension 59. The upper end of the extension 59 is beveled as at 59a (see FIG. 16).

The elements just described are particularly effective in providing the latching or restraining of the throwing arm after the same has been pivoted into a cocking position, as previously described. The latching operation follows.

Latching Operation

The arm 27 is continued to be rotated by the motor 32 until the contact arm 44a (see FIGS. 14 and 15) of microswitch 44 is forced to alternative position (designated 44' in FIG. 5 and seen therein in dotted line). In doing this, the arm lug 27a is opposed by a leaf spring (see FIGS. 13–15). Upon de-energization of motor 32, the spring 60 serves to quickly return the arm 27 toward the armature arm extension 59. This places a back spin on the motor 32 and serves to relieve any frictional engagement between the gears 29 and 30 so that these gears may become disengaged and the solenoid armature 31a become retracted. Thus, the motor is completely uncoupled from the throwing arm prior to firing. The leaf spring 60 is particularly effective in bringing about this desirable disengagement inasmuch as it operates at the end of the throwing arm 27 as contrasted to the principal spring 61 which is interconnected between bracket 46 and post 28, more particularly a laterally extending lug 28a (see FIG. 1).

The entry of lug 27a into the slot defined by plates 47 and 52 results in a temporary depression of the extension 59, made possible by the beveled end 59a thereof. The solenoid 55 is arranged to retract when energized so that the temporary retraction of the armature by the passage of arm 27 thereover is immediately attended by a return to the normal extended condition. Thus, as the arm 27 turns further clockwise (see FIG. 14), the extension 59 returns upwardly to act as a latch when the motor 32 is de-energized and the springs 60 and 61 attempt to return the arm 27 to its original position. The mechanism is now ready for loading and this will be explained in conjunction with FIGS. 5–9.

Referring now to FIG. 5, the position of the contact of microswitch 44 in the position designated 44' means that current momentarily flows through the relay 62. This occurs since the solenoid microswitch 40 is still conducting current due to the fact that a small but discrete time interval elapses between the contact of arm lug 27a with microswitch 44 to reposition the latter, and the retraction of the armature 31a of solenoid 31. For this relatively short time, current flows through the relay 62 and simultaneously charges condenser 62a which is a capacitance arranged in parallel with the relay 62. Thus, even after the contact of microswitch 44 returns to the solid line position in FIG. 5, there is current flowing through the relay 62. This stems from the fact that there is an RC constant existing by virtue of the resistance included within the relay 62 and the various electrical conduits. The relay 62, when energized, is effective to reposition contacts 62a, 62b and interlock 45. The repositioning of contact 62a applies voltage to solenoid 63 (also seen in FIGS. 1, 2, 6–8, 10 and 11). Thus, solenoid 63 is energized independent of microswitches 40 and 44, both of which have returned to normal positions, 40 being open and microswitch 44 being in a position to conduct current to motor relay 43. However, relay 62 positions interlocks 45 and 62b so that no current may flow to relay 43 but instead would be applied to relay 62 so as to maintain it in an energized condition should, for some reason, the armature 31a of solenoid 31 fail to return. Thus, even if microswitch 40 should not open, the motor relay would be deenergized and remain so with the loading mechanism stopped in the middle of its cycle, solenoid 63 being continuously energized. However, normally, solenoid 63 will be energized only for the time determined by the RC constant of the subcircuit including condenser 62a and the coil of relay 62.

Figures 6, 7, 8, 9:
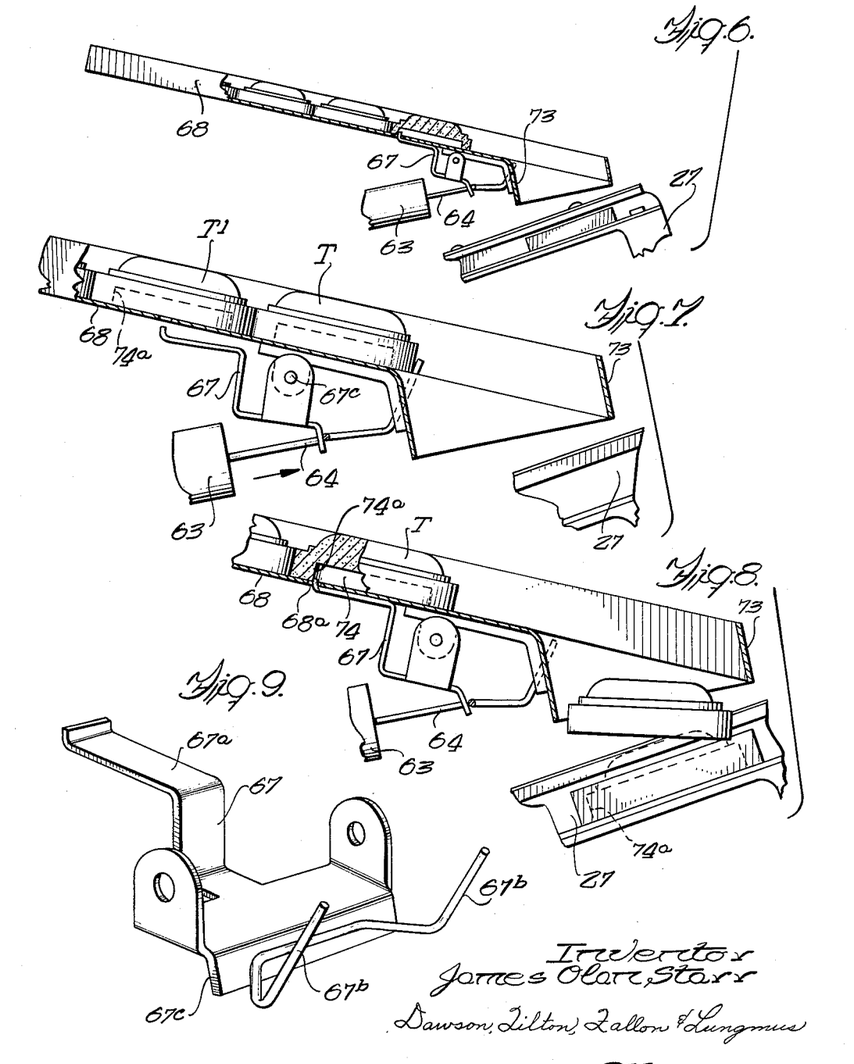
FIG. 6 is a fragmentary elevational view, partially in section, of loading mechanism incorporated in the apparatus.
FIG. 7 is an enlarged fragmentary view of the apparatus portion seen in FIG. 6 but in a different operative condition.
FIG. 8 is a view similar to FIG. 7 but showing the parts in a different operative condition, a condition which is analogous to that seen in FIG. 6.
FIG. 9 is a perspective view of a stop member provided as part of the loading mechanism and also seen in side elevation in FIGS. 6–8.

The effect of the temporary energization of solenoid 63 can be seen by reference to FIGS. 6–8. In that portion of the drawing, the numeral 64 represents the armature arm of solenoid 63. The solenoid 63, as seen in FIG.

1, for example, is mounted on a loading mechanism bracket 65 which in turn is secured to the base plate 21 by means of the loading mechanism pedestal 66.

The numeral 67 designates a pivoting bracket which is seen in enlarged form and detached from the apparatus in FIG. 9, and it is against this bracket 67 that the armature arm 64 is adapted to bear. The bracket 67 is pivotally secured to an inclined chute 68 secured to the pedestal 66. The chute 68 is equipped with a first opening designated 68a (see FIGS. 8, 10 and 11), the opening 68a permitting entry of one arm element 67a of bracket 67 into the chute 68. The chute 68 is equipped with a pair of openings 68b spaced forwardly in the direction of movement of a target T from the opening 68a. The openings 68b (readily seen in FIG. 11) accommodate the receipt of the bracket arm portion 67b (see FIG. 9). The arms 67b are on the opposite side of the pivot point 67c from the arm 67a so that when the arms 67b are retracted, the arms 67a are extended into the chute—this condition being seen in FIGS. 6 and 8. The reverse condition, where the arms 67b are extended into the chute 68 while the arm 67a is retracted, is seen in FIG. 7. The FIG. 7 condition of the apparatus corresponds to that seen in FIG. 11, while the FIG. 10 condition corresponds to that seen in FIGS. 6 and 8.

Figure 10:
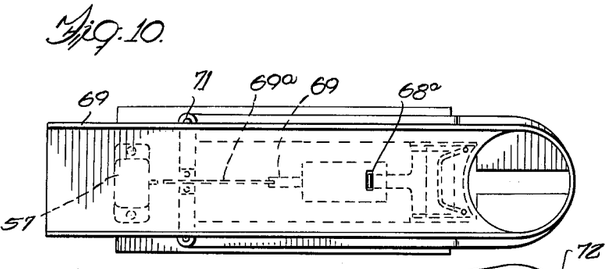
FIG. 10 is a top plan view of the loading mechanism portion of the apparatus.
Figure 11:
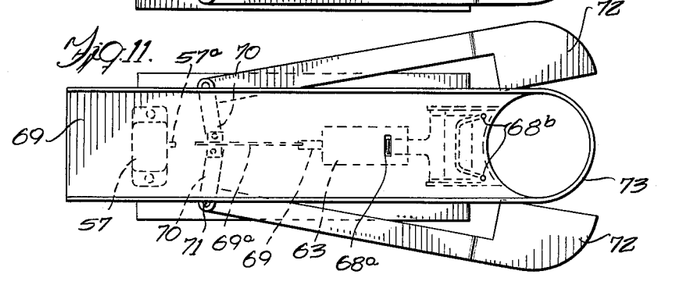
FIG. 11 is a view similar to FIG. 10 but with the parts shown in a different operative condition.

The numeral 69 designates the rear portion of the armature arm 64 and is effective to operate against interlock 57 (see FIGS. 10 and 11). For this purpose, the armature arm portion 69 is equipped with a linkage 69a which is pivotally connected to transversely disposed lever arms 70, the pivotal connection being designated 70a in FIG. 12. The lever arms 70 in turn are pivotally secured to posts 71 provided on the chute 68. The lever arms are rigidly coupled to the closure arms 72 which extend forwardly underneath the chute and provide an openable gate under the chute cup or opening 73.

The operation of the loading mechanism will now be described:

*Loading Operation*

The energization of solenoid 63 results in pivoting bracket 67 from the FIG. 6 position to the FIG. 7 position, arms 64 being extended and abutting against the lip 67c (see FIG. 9) of bracket 67. This retracts arm 67a from opening 68a, allowing a target, i.e., a "bird," to move downwardly on chute 68. The targets T are conventionally equipped with a lower recess 74 in which arm 67a is normally received when the loading mechanism is not operating. This bears against a rear wall, as at 74a (see FIG. 8). Upon pivoting of bracket 67, however, the most forward bird is able to slide forwardly a distance somewhat less than its length, i.e., diameter, before being restrained by arm 67b. If it is desired to have this forward movement achieved by gravity, the angle of the feeding trough should be sufficient to move the bird forwardly against the resistance of friction, but the angle should be limited to an extent so as not to cause the bird to be upset when entering the drop pan provided by the cup 73. In actual practice, an angle of about 15° is satisfactory. In certain instances, it may be desirable to use a spring actuator to move the targets forwardly, or a magazine if the birds are properly packaged.

Upon reverse pivoting of the bracket 67, the second bird T' (see FIG. 7) is able to move ahead a slight distance until its recess rear wall 74a engages arm 67a. This is effective to urge the leading bird T into the cup 73, past the retracted arms 67b which are positioned just ahead of the cup 73. Thus, the trailing bird effectively guides and stabilizes a bird going into the loading cup. The arms 72 are parallel with the throwing arm 27 in a cocked condition so any danger of misalignment of the target in its deposit on the arm is substantially avoided.

Simultaneously with the pivoting of the bracket 67 by solenoid 63, the operations seen in FIGS. 10 and 11 occur where arm 69 is retracted. This moves levers 70 and pivots arms 72 about post 71, opening the bottom of the cup 73 so as to deposit a target on the throwing arm 27. This action is illustrated in FIG. 8. The retraction of arm 69 opens switch 57 which inactivates the firing circuit. This can be seen in FIG. 11 where arm 67a no longer engages contact 57a of switch 57.

The condenser 62a thus regulates the time of actuation of the drop solenoid 63 to insure proper deposit of a target T on the arm 27. When this has occurred, it is only necessary to depress button 56 to release a bird T from its position on arm 27 (dotted line in FIG. 8, also seen in FIG. 3).

Depressing the button of switch 56 either by an operator or by the gunner himself—as by foot pedal, energizes the solenoid 55 to retract latch 59 thus releasing arm 27 under the influence of spring 61. The bird T is swept out along arm 27 toward the unconnected end thereof, being guided by a resilient strip 75 (see FIG. 3). The arm 27 is additionally equipped with a guide pan 76 (see FIGS. 2 and 3) which aids in positioning a target T under the strip 75. The guide pan 76 is on the leading side of the arm 27 when the arm is in its triggered condition. Thus, the pan 76 is on the side opposite the strip 75 and extends along only a portion of the length of the arm 27 from the post 28, that portion being adjacent to cup 73 when the arm 27 is in the cocked position.

In operation, the elevation and bearing of the device can be changed to develop different "throws"—ordinarily it is desired to restrict the elevation to a zenith of throw of about 12 feet so as to accommodate the same to indoor trap shooting. However, this may be altered by changing the inclination of the base 20 as by shortening or lengthening the support 20a. The bearing can be changed readily by repositioning the plate 21 on the base 20 through loosening bolts 22. Thus, the bolts 22 will be located in different positions in the slots 23. The bearing may also be changed by changing the length of the arm—the longer the travel of the target on the arm, the more the change in azimuth.

Figures 12, 17, 18:
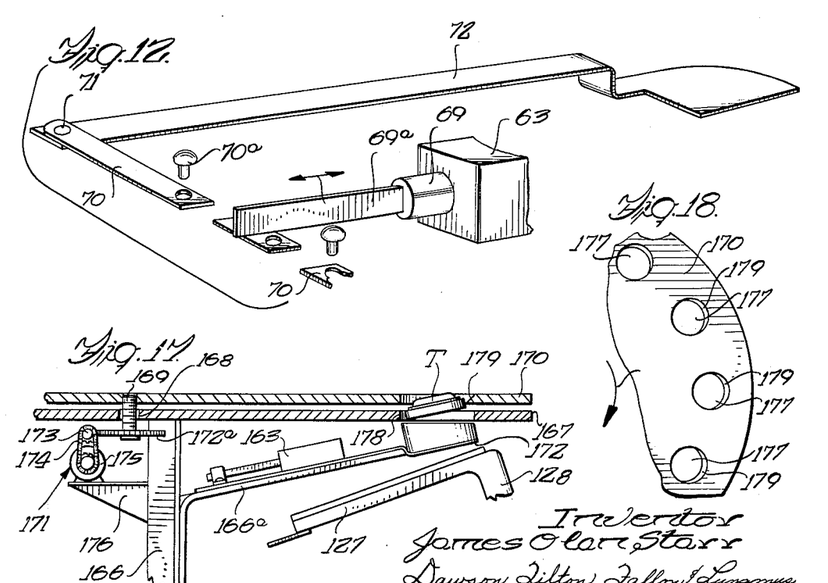
FIG. 12 is a fragmentary perspective view in exploded form of a portion of the loading mechanism seen in FIGS. 10 and 11.
FIG. 17 is a fragmentary elevational view, partially in section, of a modified form of the apparatus featuring a different loading mechanism.
FIG. 18 is a fragmentary top plan view of the apparatus seen in FIG. 17.
Figures 13, 14, 15, 16:
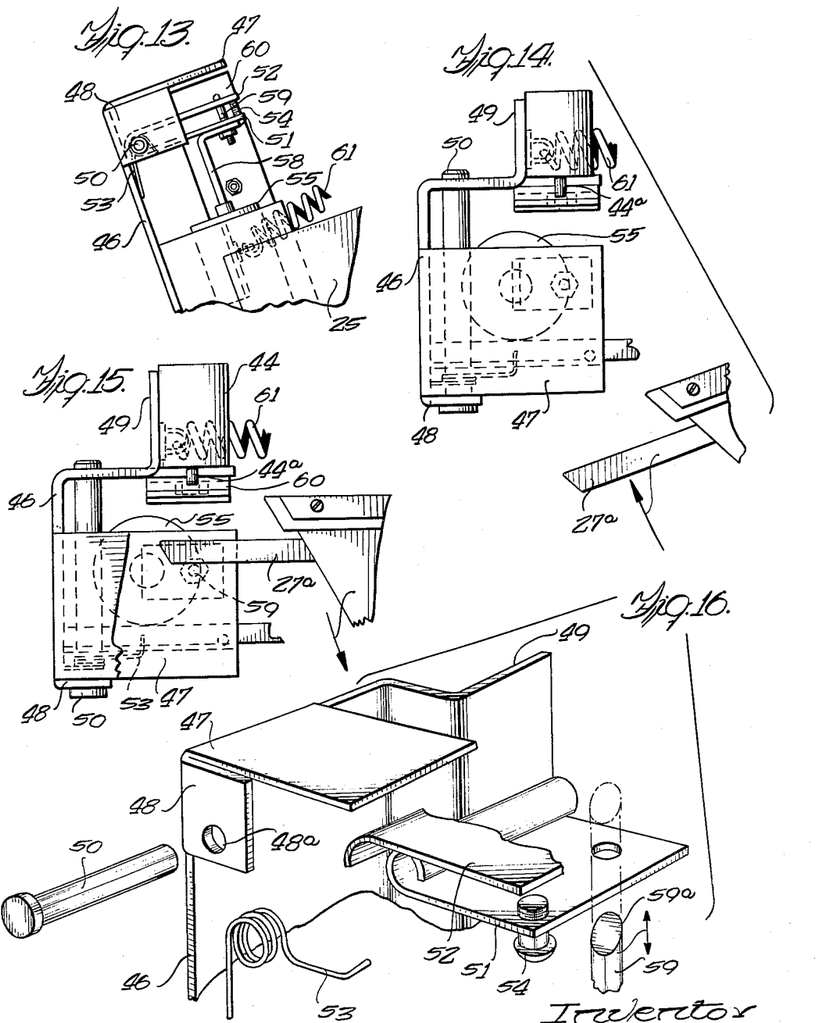
FIG. 13 is a fragmentary side elevational view of a cocking mechanism, seen in reduced scale in FIG. 1.
FIG. 14 is a top plan view of the apparatus seen in FIG. 13 and with the throwing arm of the target-throwing apparatus approaching a position of being cocked.
FIG. 15 is a view similar to FIG. 14 but partially broken away and with the throwing arm just being triggered.
FIG. 16 is a perspective view in exploded form of a portion of the apparatus seen in FIGS. 13–15.

In an alternative form of the invention, as can be seen from FIGS. 17 and 18 of the drawing, the loading mechanism is supported on a vertical member 166, which corresponds essentially to the pedestal 66 of FIG. 1. Secured to the upper portion of the member 166 is a flat stationary table 167. Also seen in FIG. 17 is the throwing arm 127 and the post portion 128 which corresponds to elements 27 and 28 of FIG. 1. The table 167 is apertured as at 168 and rotatably supports a vertical shaft 169. The shaft 169 carries at its upper portion a turntable 170.

Means for rotating the turntable 170 are provided in the form of the motor and gear arrangement generally designated 171 in FIG. 17. The motor and gear arrangement 171 includes a worm gear 172a secured to the lower portion of the shaft 169 which is engaged by a worm 173. The worm 173 is coupled through a reduction mechanism 174 to a motor 175. The motor 175 is supported on a pedestal bracket 176 which is seen to be attached to the vertical member 166.

The turntable 170 is seen to be equipped with a plurality of circumferentially disposed openings 177 (see FIG. 18). As the turntable 170 rotates, the openings 177 are brought into registry with a corresponding opening 178 in the table 167. The stepwise movement of the turntable 170 is provided by the motor 175, and, in the illustration given, the motor 175 makes one revolution for each stepwise movement of the turntable 170. The gear head motor 175 is energized by a signal from the relay 62. The relay 62 is effective to open the closure arms 172 which are actuated by the solenoid 163 mounted on a bracket 166a much the same as is provided in the previous modification seen in FIG. 1.

Reference to FIG. 18 shows that each of the apertures 177 is equipped with a partial shroud 179 which is positioned on the top surface of turntable 170 and thus overlies a portion of each opening 177—the portion so covered being on the rearward side of the opening 177 when the direction of rotation of the turntable 170 is considered. The shroud 179 effectively stabilizes a bird or target T when the same is positioned over the opening 178 in the table 167. Through the employment of the shroud 179, the target T is maintained with its base substantially horizontal until the openings 177 and 178 are substantially in registry, thus insuring that the target will be deposited on the closure arm 172 with its base lowermost.

In some instances, it may be desirable to provide completely automatic operation of the apparatus or an operation where only the marksman needs to signal for the release of a target. Such an arrangement is possible by means of the circuit seen in FIG. 19.

Figure 19:
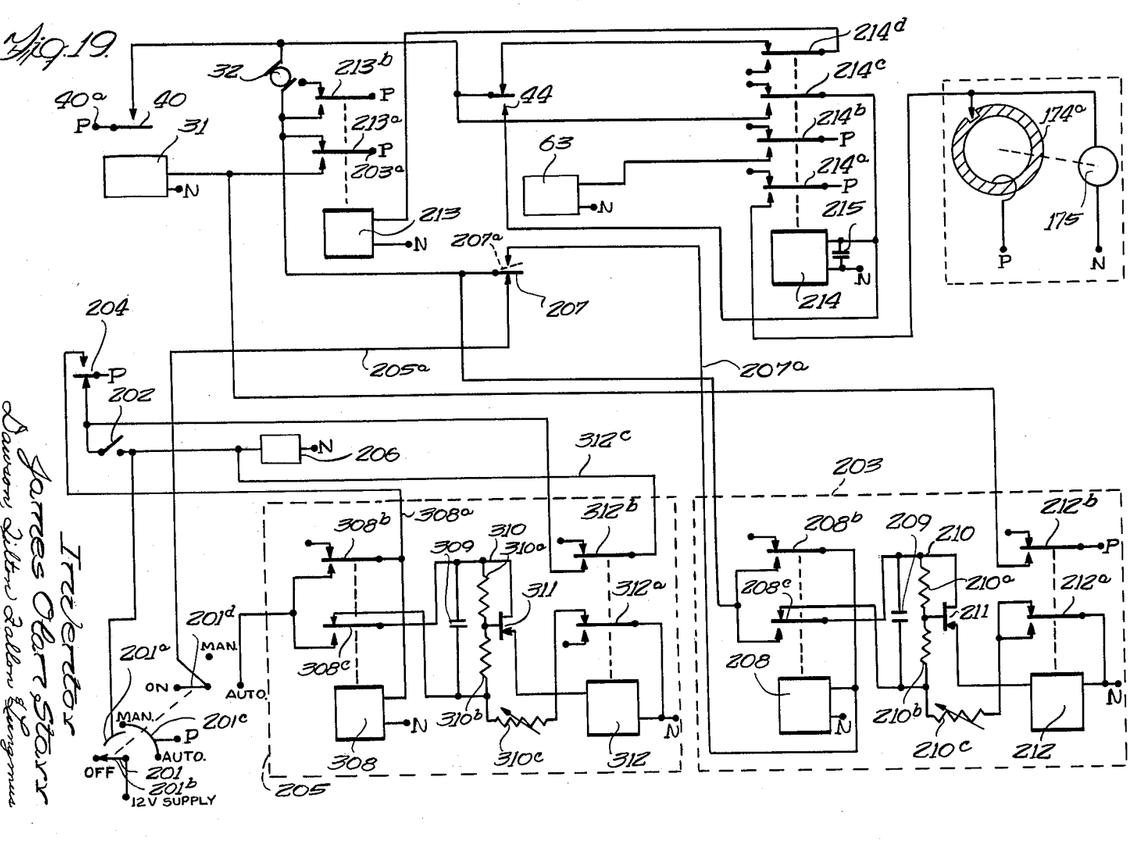
FIG. 19 is a schematic diagram of an electrical circuit which provides for automatic operation of the apparatus.

For this purpose, a multi-positioned switch may be employed such as is schematically represented by the numeral 201 in FIG. 19. The switch 201 is seen to have an "Off" position, a "Manual" position, and an "Automatic" position. By placing the switch in the "Manual" position, circuitry is employed to cock and load the throwing arm 27. Thereafter, the marksman or the apparatus operator closes the manual fire switch 202 to release or "fire" a target. The release of the target through the movement of the throwing arm 27 is effective to recock and reload the throwing arm 27 through the time delay circuit designated 203 and enclosed in dotted line. Reclosing of the manual fire switch 202 results in another firing target and the subsequent recocking and reloading follow automatically. This operation could be termed semi-automatic.

For a fully automatic operation, the switch 201 is placed in the "Automatic" position and the act of so positioning the switch moves the contacts of the switch through the "Manual" position so that the apparatus is cocked and loaded merely by the act of placing the switch in the "Automatic" position. The safety microswitch 204 (which may be incorporated into the switch 57 as in FIG. 5) is provided as part of the firing circuit. The signal from the switch 204 energizes a time delay circuit 205, which thereafter results in providing a signal to the "fire" solenoid 206. The "fire" solenoid 206 is a counterpart of the solenoid 55 in FIG. 5. The operation of the "fire" solenoid 206 results in actuating a microswitch 207, which in turn results in re-energizing of the time delay circuit responsible for cocking and loading of the apparatus.

The operation of the circuit seen in FIG. 19 will now be described in greater detail. The initial step performed is to operate the switch 201. The switch 201, when turned clockwise as seen in FIG. 19, initially engages a resilient contact 201a. The arm of the switch 201b which makes this contact is effective to supply direct current voltage through the contact 201a to the fire solenoid 206. The contact 201a overlaps slightly a second contact 201c so that during the movement of the arm 201b, direct current voltage is supplied not only to the fire solenoid 206 but to the various portions of the circuit which are equipped with contacts P.

The switch 201 is equipped with a second arm 201d which, when the switch is placed in the "Manual" position, is ineffective to transmit any current.

During the time when the switch arm 201b contacts both the contacts 201a and 201c, power is transmitted to the relay 208 of the cocking circuit 203, as from the source 203a. The source 203a is initially connected through the fire solenoid 207 and line 207a. For this purpose, the fire solenoid 207 has its arm shifted to the position 207b under the influence of the fire solenoid 206—the latter being temporarily energized by the arm 201b contacting the contact 201a. When the contact 201a is no longer engaged by the arm 201b, the microswitch arm on microswitch 207 returns to the solid line position of FIG. 19, and current from source 203a no longer is able to reach relay 208 through the line 207a. Instead, the current from the source 203a proceeds to the relay 208 through the line 208a. Thus, the relay 208 has latched in its own power source through the repositioning of the relay arm 208b.

With the relay 208 being energized, current from source 203a is applied across the condenser 209 by virtue of the relocation of the relay contact 208c. The contact 208c in the "rest" position provides a shunt for the timing condenser 209. When, however, the contact 208c is moved from the rest position seen in FIG. 19, direct current voltage is applied to the condenser 209 and to the resistance network 210 which is arranged in parallel with the condenser 209. Arranged in parallel with the resistance 210a of the resistance network 210 is a transistor 211 which has the collector coupled to one end of resistance 210a and the base to the other end. The emitter of the transistor 211 provides the power for relay 212. The energization of relay 212 results ordinarily in the repositioning of contacts 212a and 212b thereof. The repositioning of contact 212a results in eliminating the resistances 210b and 210c from the resistance network 210 so that the base of the transistor 211 is subjected to the total voltage available and thus the transistor 211 becomes non-conductive. By variation of the resistance 210c, we can vary the charging of the condenser 209 and thus the time of actuation of the relay 212. Thus, through the regulation of the resistance 210c, the time interval between the operation of relays 208 and 212 can be regulated.

The actuation of the relay 212 also results in the repositioning of the relay contact 212b. This repositioning provides direct current voltage to the clutch solenoid 31 through line 212c. The clutch solenoid 31 can be clearly seen in FIG. 4, and this element positions the pinion gear 30 for driving of the segment gear 29 for repositioning the arm 27. The actuation of the clutch solenoid 31 also results in the closing of the clutch microswitch 40 (also seen in FIG. 4). The closing of the microswitch 40 energizes the motor relay 213 which is equipped with contacts 213a and 213b. The movement of the contact 213a shifts the voltage from relay 208 to the clutch solenoid 31. Thus, the adjustable time delay relay circuit for initiating the cocking is no longer activated, while the clutch solenoid is. The contact 213b of the relay 213 is effective to apply direct current voltage to the motor.

The circuit 203 is effective to energize the cocking motor 32 whenever the clutch solenoid 31 is able to operate through the proper matching of the gears 29 and 30. The circuit 203 provides the additional advantage that when the gears 29 and 30 are not properly engageable, the circuit 203 provides a series of pulses to the clutch solenoid 31 so as to eventually bring the gear teeth of the gears 29 and 30 into proper matching relation. This occurs because the operation of the relay 212 is ineffective to interrupt the power from the source 203a whenever the clutch solenoid cannot operate to the extent to engage the clutch microswitch 40. This occurs whenever the gear teeth in the gears 29 and 30 are improperly aligned. The clutch solenoid cannot close the clutch microswitch 40, so that power from source 203a is still on the relay 208. Similarly, power from source 203a is also on the condenser 209 and the resistance network 210. The relay 212, which has returned to its rest position, is again activated after the time determined by the setting of the resistance 210c. This supplies a second pulse to the clutch solenoid 31 and the sequence of pulses delivered to the clutch solenoid 31 has been found effective to eventually bring the gears 29 and 30 into proper registry, whereupon the motor 32 takes over to rotate the arm 27 into the cocked position.

The motor 32 continues rotating until the arm 27 contacts the limit microswitch 44. The microswitch 44 in having its contact shifted from the position seen in FIG. 19 to its alternate position, delivers current from the clutch microswitch 40 (more particularly, the source 40a thereof) to the drop relay 214. The drop relay 214 is a four-pole, double-throw relay having four poles 214a, b, c and d. The repositioning of pole 214a results in applying current to the motor 175 and the switch 174a of the reduction mechanism 174. The mechanism 174 and motor 175 are conventional elements, such as an electric windshield wiper type of motor.

The energization of the drop relay 214 in repositioning pole 214b results in energizing drop solenoid 63 which is effective to open the arms 72 and drop a target T onto the arm 27.

The repositioning of the pole 214c provides a latch on the drop relay 214 to supply current therefor, while the repositioning of the pole 214d effects a break in the current line supplying the motor relay 213 so as to stop the operation of the motor 32. At this point, the cocking has been completed and the throwing arm 27 has been loaded. The time during which the drop relay is operative is determined by the condenser 215—this effectively regulating the time of energization of the drop solenoids 63. In this respect, the instant circuit is a counterpart of the circuit seen in FIG. 5, especially relative to the condenser 62a.

The switch 201, being set on manual, permits the mechanism to be fired through the depression of the manual fire switch 202. The depression of the switch 202 applies current to the fire solenoid 206, retracts the extension 59—in this respect, the fire solenoid 206 being the equivalent of the solenoid 55 seen in FIG. 15. As the throwing arm 27 is released, the target T is forced outwardly thereon and is discharged for the marksman. The energization of the fire solenoid 206 of FIG. 19 is accompanied by the closing of the microswitch 207 which sets in effect the operation of circuit 203 to recock and reload the throwing arm 27.

If desired, the switch 201 may be positioned in the "Automatic" position and this will bring into play the adjustable time delay relay circuit 205, seen in FIG. 19. As before, the switching of the switch arm 201b initially energizes the fire solenoid 206 through the temporary contact of the arm 201b with the resilient contact 201a. This assumes that the switch is moved from the off position to the "Automatic" position. However, the inventive structure may be operated equally well by shifting from the "Manual" to the "Automatic" position since whenever the switch 201 is in the "Manual" position, the arm 27 will have been cocked through the operation of the circuitry just described. In this connection it is seen that the contact 201c is mutual to both the manual and automatic positions. However, the switch 201, through the operation of the arm 201d, additionally connects the fire solenoid microswitch 207 with the circuit 205 through the line 205a. The circuit 205 is initially energized by a pulse from the fire safety microswitch 204 which can be seen in FIGS. 10 and 11 as the microswitch 57. This microswitch 57 is energized by the opening of the arms 72 to permit the contact 57a thereof to move outwardly to the position seen in FIG. 11. As pointed out previously, the equipment cannot be fired whenever the safety microswitch 57 (204 in FIG. 19) is not in its rest or heavy-line position of FIG. 19. The opening of the fire safety microswitch 204 causes power to be delivered to the relay 308 via the line 308a. This results in a temporary energization of the poles 308c and 308b, much the same as the poles 208b and 208c of the relay 208 are actuated. Also, in similar fashion, the circuit 205 (like circuit 203) receives a holding current from the source 203 through the line 205a. This occurs only when the fire solenoid microswitch 207 is in the solid-line position, which occurs after the cocking and the loading have been achieved.

The circuit 205 is equipped with a condenser 309 similar to the condenser 209 of circuit 203 and is also equipped with a resistance network 310, transistor 311, and relay 312. The resistance network 310 includes resistances 310a, 310b, and adjustable resistance 310c, which can be regulated to vary the time elapsing between the energization of relay 308 and the energization of relay 312. When relay 312 is energized, the poles thereof, namely, 312a and 312b, are moved, the contact or pole 312b being effective to apply current to the fire solenoid 206 through the line 312c—much the same as the relay 212 applies current to the clutch solenoid through the line 212c.

I claim:
1. In target-throwing apparatus, a base, a throwing arm pivotally mounted on said base, spring means interconnected between said arm and base, motor means on said base operative to pivot said arm in one direction, said spring means being effective to pivot said arm in the opposite direction, a latch mounted on said base effective to restrain said arm against the urging of said spring means, and a target-loading mechanism on said base adapted to deposit a target on said arm adjacent its pivotal mounting only when said arm is restrained by said latch, said mechanism being actuated by the engagement of said arm with said latch, an arm release element on said latch, and means provided in said mechanism for inactivating said release element during operation of said mechanism, said latch being equipped with means for developing an electrical signal of a duration less than the operation of said mechanism, said mechanism being equipped with signal-responsive means and capacitance means to prolong the electrical signal.

2. The structure of claim 1 in which said signal-responsive means is relay means connected in parallel with said capacitance means, said mechanism including an inclined chute equipped with an openable gate, said relay means being operative to open said gate.

3. In throwing apparatus for generally disc-shaped targets equipped with recesses in the bottom walls thereof, a base, an arm pivotally mounted on said base, a latch-providing element on said base, a spring extending between said arm and element operative to urge said arm away from said element, motor means on said base for pivoting said arm against the urging of said spring and into engagement with said element, a chute supported on said base for placing a target on said arm when the said arm is in engagement with said element, said chute being equipped with bracket means adapted to restrain succeeding targets during the placing of a target on said arm and thereafter permitting predetermined movement of said succeeding targets, said bracket means after said predetermined movement restraining all but the leading target of said succeeding targets, said chute being equipped with a gate in the bottom wall thereof, said bracket means being positioned adjacent said gate and equipped with upstanding, spaced-apart stop elements, one of said elements being extensible into said chute into the recess of the target.

4. In target-throwing apparatus, a base, a throwing arm pivotally mounted on said base, spring means interconnected between said arm and base, motor means on said base operative to pivot said arm in one direction, said spring means being effective to pivot said arm in the opposite direction, a latch mounted on said base effective to restrain said arm against the urging of said spring means, a target-loading mechanism on said base adapted to deposit a target on said arm adjacent its pivotal mounting only when said arm is restrained by said latch, said mechanism being actuated by the engagement of said arm with said latch, an arm release element on said latch, means provided in said mechanism for inactivating said release element during operation of said mechanism, a gear train interposed between said motor means and said arm, solenoid means for selectively engaging adjacent gears in said gear train to couple said motor means to said arm, and a spring on said frame adjacent said latch operative to oppose the arm movement developed by said motor means to impart a reverse action to said motor means for disengaging said adjacent means.

5. In target-throwing apparatus, a base, a throwing arm pivotally mounted on said base, spring means interconnected between said arm and base, motor means on said base operative to pivot said arm in one direction, said spring means being effective to pivot said arm in the opposite direction, a latch mounted on said base effective to restrain said arm against the urging of said spring means, a target-loading mechanism on said base adapted to deposit a target on said arm adjacent its pivotal mounting only when said arm is restrained by said latch, said mechanism being actuated by the engagement of said arm with said latch, an arm release element on said latch, means provided in said mechanism for inactivating said release element during operation of said mechanism, a gear train interposed between said motor means and said arm, solenoid means for selectively engaging adjacent gears in said gear train to couple said motor means to said arm, a spring on said frame adjacent said latch operative to oppose the arm movement developed by said motor means to impart a reverse action to said motor means for disengaging said adjacent means, and electromechanical means coupled to said solenoid means for energizing the same, said electromechanical means being effective to provide repeated engagement actions of said adjacent gears to mate the same.

6. In target-throwing apparatus, a base, a throwing arm pivotally mounted on said base, spring means interconnected between said arm and base, motor means on said base operative to pivot said arm in one direction, said spring means being effective to pivot said arm in the opposite direction, a latch mounted on said base effective to restrain said arm against the urging of said spring means, a target-loading mechanism on said base adapted to deposit a target on said arm adjacent its pivotal mounting only when said arm is restrained by said latch, said mechanism being actuated by the engagement of said arm with said latch, an arm release element on said latch, and means provided in said mechanism for inactivating said release element during operation of said mechanism, said latch being equipped with means for developing an electrical signal of a duration less than the operation of said mechanism, said mechanism being equipped with an electrical circuit having an RC constant for effectively prolonging the electrical signal.

7. In throwing apparatus for generally disc-shaped targets equipped with recesses in the bottom walls thereof, a base, an arm pivotally mounted on said base, a latch-providing element on said base, a spring extending between said arm and element operative to urge said arm away from said element, motor means in said base for pivoting said arm against the urging of said spring and into engagement with said element, a chute supported on said base for placing a target on said arm when said arm is in engagement with said element, said chute being equipped with bracket means adapted to restrain succeeding targets during the placing of a target on said arm and thereafter permitting a predetermined movement of said succeeding targets, said bracket means, after said predetermined movement, restraining all but the leading target of said succeeding targets, said chute being equipped with a gate in the bottom wall thereof, said bracket means being positioned adjacent said gate and equipped with upstanding, spaced-apart stop elements, one of said elements being extensible into said chute into the recess of a target, and means for opening said gate only when the other of said stop elements is positioned in the path of targets on said chute.

References Cited in the file of this patent

UNITED STATES PATENTS

| | | |
|---|---|---|
| 2,310,746 | Parker et al. | Feb. 9, 1943 |
| 2,652,820 | Darrell | Sept. 22, 1953 |
| 2,928,383 | Ohlson | Mar. 15, 1960 |